US006446868B1

(12) United States Patent
Robertson et al.

(10) Patent No.: US 6,446,868 B1
(45) Date of Patent: Sep. 10, 2002

(54) SCANNING SYSTEM FOR DECODING TWO-DIMENSIONAL BARCODE SYMBOLOGIES WITH A ONE-DIMENSIONAL GENERAL PURPOSE SCANNER

(75) Inventors: Brent G. Robertson, Richardson; Glenn W. Lee; Roger J. Colburn, both of Plano, all of TX (US)

(73) Assignee: Informatics, Inc., Plano, TX (US)

( * ) Notice: Subject to any disclaimer, the term of this patent is extended or adjusted under 35 U.S.C. 154(b) by 0 days.

(21) Appl. No.: 09/198,125

(22) Filed: Nov. 23, 1998

(51) Int. Cl.⁷ .................................................. G06K 7/10
(52) U.S. Cl. .............................. 235/462.1; 235/462.16; 235/462.11
(58) Field of Search ........................ 235/462.07, 462.08, 235/462.09, 462.1, 462.12, 462.25, 462.27, 494; 902/26

(56) References Cited

U.S. PATENT DOCUMENTS

| | | | |
|---|---|---|---|
| 3,585,369 A | 6/1971 | Nather et al. ............ 235/61.11 |
| 4,360,798 A | 11/1982 | Swartz et al. ............ 340/146.3 |
| 4,392,207 A | 7/1983 | Dockal ........................ 364/900 |
| 4,460,120 A | 7/1984 | Shepard et al. ............. 235/472 |
| 4,860,226 A | 8/1989 | Martin et al. ................ 364/552 |
| 4,877,948 A | 10/1989 | Krueger ...................... 235/449 |
| 4,941,174 A | 7/1990 | Ingham ........................ 380/52 |
| 5,144,314 A | 9/1992 | Malmberg et al. ............ 342/44 |
| 5,179,710 A | 1/1993 | Coschieri .................... 395/750 |
| 5,184,005 A | 2/1993 | Ukai et al. .................. 235/472 |
| 5,245,167 A | 9/1993 | Takenaka .................... 235/462 |
| 5,274,567 A | 12/1993 | Kallin et al. ................ 364/478 |
| 5,280,336 A | 1/1994 | Fantone ...................... 356/124 |
| 5,313,642 A | 5/1994 | Seigel ......................... 395/75 |
| 5,410,141 A | 4/1995 | Koenck et al. ............. 235/472 |
| 5,478,997 A | 12/1995 | Bridgelall et al. .......... 235/462 |
| 5,512,739 A | 4/1996 | Chandler et al. ........... 235/462 |
| 5,561,282 A | 10/1996 | Price et al. ................. 235/380 |
| 5,591,955 A | 1/1997 | Laser ......................... 235/472 |
| 5,600,121 A | 2/1997 | Kahn et al. ................. 235/472 |
| 5,608,200 A | 3/1997 | Le Goff et al. ............. 235/462 |
| 5,614,706 A | 3/1997 | Bard et al. .................. 235/472 |
| 5,627,358 A | * 5/1997 | Roustaei ................ 235/462.11 |
| 5,659,800 A | 8/1997 | Zhang et al. ............... 395/882 |
| 5,756,981 A | * 5/1998 | Roustaei et al. ............ 235/462 |

OTHER PUBLICATIONS

Johnston, Robert B. and Yap, Alvin Khin Choy, "Two Dimensional Bar Code As A Medium For Electronic Data Interchange", Oct. 17, 1998, pp. 1–8, http://www.bs.monash.edu.au/staff/johno/BARCOPAW.html.

BarCodeUSA.com, "What is a Bar Code?", Oct. 7, 1998, pp. 1–2, http://www.barcodeusa.com/barcode_1.htm.

(List continued on next page.)

Primary Examiner—Michael G. Lee
Assistant Examiner—Ahshik Kim
(74) Attorney, Agent, or Firm—Akin, Gump, Strauss, Hauer & Feld, L.L.P.

(57) ABSTRACT

A method and apparatus for decoding two-dimensional barcode symbols from a data stream generated by scanning a two-dimensional barcode with a one-dimensional scanner. A decoding process according to one embodiment of the invention involves coupling the one-dimensional scanner to a serial or other port of a host computer in order to provide a data stream to a software decoder resident in the host computer. The software decoder performs a series of iterative steps in which the data stream is sampled at regular intervals to convert the data stream to a series of elements (e.g., bars and spaces). Barcode symbol data characters are then derived from the elements. A symbol matrix is next constructed, the matrix being representative of the two-dimensional barcode symbol.

17 Claims, 8 Drawing Sheets

OTHER PUBLICATIONS

"Bar Coding Symbologies", Oct. 7, 1998, pp. 1–5, http://palette.ecu.purdue.edu/~tanchoen/ADC/BarCodes/symbologies.html.

BarCodeUSA.com, "MicroPDF417", Oct. 7, 1998, pp. 1–2, http://www.barcodeusa.com/barcode_25.htm.

"Bar Codes", Oct. 7, 1998, pp. 1–6, http://www.geocities.com/Eureka/Concourse/1608/Barcodes.htm.

Adams, Russ, "Two–dimensional tsunami", May 1998, pp. 1–5, http://www.autoidnews.com/0598/newsymbol.html, *Automatic I.D. News*—Bar Codes Basics.

Moore, Bert, "Scanning the horizon", Jan. 1998, pp. 1–5, http://www.autoidnews.com/technologies/concepts/scanning.htm, *Automatic I.D. News*.

Auto Image ID, Inc., "New ID3100 Scanner Marks Breakthrough In Two Dimensional Symbology Scanning", Copyright 1997, pp. 1–4, http://www.autoimageid.com/html/id3100_news_release.htm.

Cognitive Solutions, Inc., "Bar Code Information", Copyright 1997, pp. 1–5, http://www.dhtech.com/csi/csibar.htm.

Auto Image ID, Inc., "A Whole New Dimension in Auto ID, Two–Dimensional Symbology Scanning!", Last Update: Aug. 16, 1997, pp. 1–3, http://www.autoimageid.com/html/2d_guide.html.

Longacre, Jr., Andrew, "Emerging Barcode Symbologies", Copyright 1997, pp. 1–6, http://dcd.welchallyn.com/techover/2dsymbol.htm, *AIM International* Technical Review 1996 pp 18–21.

Lee, Glenn, "The Auto ID Book", Copyright 1996, pp. 20–28, Bar Code Symbologies.

Baumeister, Jerry, "Basic Serial Interface", Revised: Apr. 21, 1996, pp. 1–5, http://www.wp.com/jbgizmo/page2.html.

Gouse, Martha A., "Direct–to–Computer Bar Code Reading", Feb. 1993, p. 76, IDSystems, vol. 13 No. 2, New Products Close–Up.

Vertical Technologies, Inc., "The Comprehensive Scanning System for Reading, Producing and Customizing Your Own Bar Codes", Date Unknown.

Vertical Technologies, Inc., "Inventory Control, The Quickest and Most Accurate Way to Read Bar Code Data into Your Program!", Date Unknown, Form No. 516341.

Computer Resources Group, "Know–Wedge™—The First Software Solution to Decoding Bar Codes", Exact Date Unknown—Before Jul. 29, 1992, pp. 1–2.

Aedex Corporation, "Aedex Gives You the Edge™", Copyright 1987, pp. 1–2.

"Scan–One", Date Unknown.

Micro Computer Specialist, Inc. "FlexScan/RS™—Bar Code Decoder for MS–DOS and Windows", Date Unknown, pp. 1–2, Literature # 683SPEC1.

* cited by examiner

SCANNING SYSTEM FOR DECODING TWO-DIMENSIONAL BARCODE SYMBOLOGIES WITH A ONE-DIMENSIONAL GENERAL PURPOSE SCANNER

BACKGROUND OF THE INVENTION

1. Field of the Invention

The invention relates generally to the field of symbol or matrix scanning systems, and more particularly to a system for scanning two-dimensional symbologies, including barcodes, (e.g., portable data files) using a one-dimensional scanner.

2. Description of the Related Art

Barcode scanning systems are finding an ever-increasing number of uses and applications. For example, barcoding may be utilized for inventory and warehousing applications, as well as with point of sale terminals. Many different types and complexities of barcodes systems are in use today. A basic barcode symbol scanning system consists of a barcode scanner, a decoder and a computer. The scanner and decoder are utilized to retrieve information from barcodes for use by the computer system.

As part of a barcode reading system, a decoder can be defined as an electronic package that receives a signal from the scanner, performs an algorithm to interpret the signal into meaningful data, and provides the data to other devices of the system. There are 3 main types of decoders: wedge decoders, serial decoders and software decoders. Wedge decoders are external devices that generally wedge between a keyboard and terminal. With keyboard wedge decoders, the data appears as though it was manually typed or keyed directly into the computer. Serial decoders are also external devices that connect into a communications port of the personal computer. Likewise, expensive decoded scanners (i.e., scanners in which the decoder is integrated, usually into the handle of the scanner) usually connect via a keyboard wedge or via a serial port.

Software decoders provide decoding functionality in software executed on a host computer. Many input devices can be used in conjunction with an adapter to plug directly into the serial port of a computer using a software decoder. Unlike software decoders, wedge decoders and serial decoders generally cannot be upgraded to support new symbologies and are thus limited with respect to future capabilities.

Many different types of scanning devices are available. Scanning devices include wands, charge coupled device (CCD) scanners and laser scanners. Wand scanners tend to be the least expensive, followed by CCD scanners and laser scanners (the most expensive). Most scanning devices use a light emitting diode (LED) and a photo detector to scan barcodes. The light generated from the LED falls on the barcodes and is absorbed by the printed bars and reflected by the white spaces. The photodetector senses the reflected light and electro-optically converts the reflected light into a signal. The digitized signal is then sent to a decoder and converted into ASCII or other characters.

Currently, there are more than 400 barcode symbologies in use. Each character in the barcode symbol is generally represented by a series of bars and spaces. Typically, the barcode symbol includes a quiet zone, start code or pattern, data characters, stop code and trailing quiet zone. Many symbologies support check digit(s) to ensure data integrity. With such symbologies, the check digit(s) is usually located before the stop code. A "symbol" is a combination of barcode characters (including the start/stop codes, quiet zones, data characters and check characters required by a particular symbology) that forms a complete, scannable entity.

SUMMARY OF THE INVENTION

Briefly, a scanning system according to the preferred embodiment of the invention utilizes an inexpensive one-dimensional scanner connected to a serial port of a computer system via an adapter. The adapter functions to convert and remap the scanners TTL signals and to pass raw or undecoded scan data to the serial port of the computer system. The serial port pins are thus used in a non-traditional manner for communicating scanned images of a two-dimensional barcode symbol, or other matrix symbologies, to the computer system. A unique software decoder residing in the computer system then performs image decoding.

In operation, the one-dimensional scanner scans a two-dimensional symbol or matrix, the resulting undecoded data stream is decoded by the software decoder. The software decoder performs a series of iterative steps in which the data stream provided the scanner is sampled and converted to symbol elements. Next, symbol characters are derived from the elements, and a symbol matrix is constructed. Optional error detection and correction procedures may also be performed to construct the finalized decoded barcode symbol. The present invention thus obviates the need for expensive scanning and decoding hardware for decoding two-dimensional symbols.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

Figure 1:
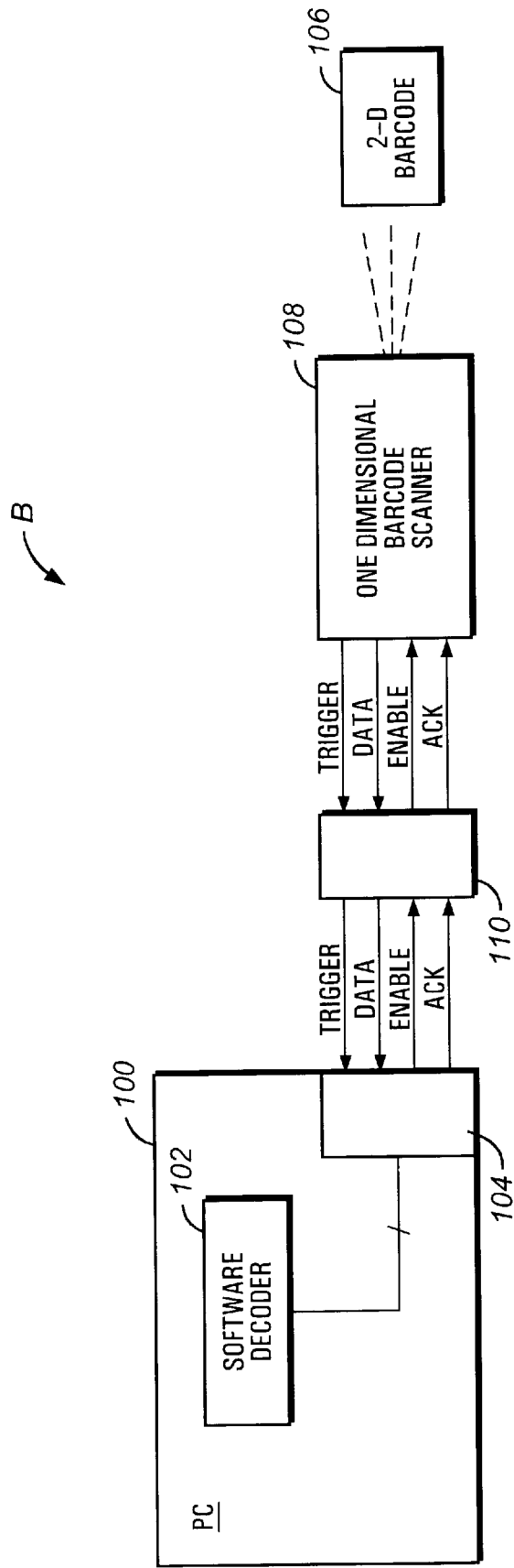
FIG. 1 is a block diagram of an exemplary system capable of performing software decoding of two-dimensional barcodes in accordance with the present invention.

Referring now to FIG. 1, a block diagram of an exemplary barcode scanning system B in accordance with the present invention as shown. The barcode scanning system B employs a software decoder 100 executed on a host computer 102 to perform decoding of two-dimensional barcodes based on information provided by one-dimensional barcode scanner 108. The barcode scanner 108 is coupled to the serial port 104 of the host computer 102 via an adapter circuit 110. Undecoded data provided by the one-dimensional barcode scanner 108 is generated by scanning operations on the two-dimensional barcode 106. Further details of one such two-dimensional barcode 106 are provided in conjunction with FIG. 2.

A number of signals are communicated between the barcode scanner 108 and the host computer 102. More specifically, a trigger signal TRIGGER is asserted following depression of a trigger or other activation mechanism (not separately illustrated) on the barcode scanner 108. Following assertion of the trigger signal TRIGGER, the host computer 102 asserts an enable signal ENABLE to the barcode scanner 108 in order to allow valid data signals to be communicated to the host computer 102. The undecoded data signal(s) DATA communicate the barcode scanner 108 output to the host computer 102. An optional acknowledge signal ACK may be communicated from the host computer 102 to the barcode scanner 108 to provide an indication of completion of the decoding process.

If the serial port 104 is an RS232 compliant port, the main function of the adapter 110 of the disclosed embodiment of the invention is to convert the 5 volt signals to/from the scanner 108 to the 12 volt level required by the serial port 104. In the preferred embodiment of the invention, it is contemplated that at least four of the standard RS232 signals are utilized for communications between the host computer 102 and the scanner 108. These signals include the data set ready (DSR) signal, the request to send (RTS) signal, the clear to send (CTS) signal and the data terminal ready (DTR). More specifically, the data signal DATA is connected to the CTS signal of the serial port 104. As discussed in greater detail below, the data signal DATA from the barcode scanner 108 is the signal sampled to reconstruct a two-dimensional barcode 106. The trigger signal TRIGGER is connected to the DSR signal of the serial port 104, while the enable signal ENABLE is coupled to the RTS signal of the serial port 104. In additional, the optional acknowledge signal ACK is connected to the DTR signal of the serial port 104. When used in such a manner, the adapter 110 preferably includes 25 pins (referred to as DB25) on the host computer 102 side and nine pins (referred to as DB9) on the scanner 108 side. Power is preferably supplied to the scanner 108 via a power tap connection.

It is further contemplated that the serial port 104 may be a communications port conforming to a number of standards other than RS232, including the universal serial bus (USB) standard. Alternatively, a PC card slot or similar interface may be utilized.

Figure 2:
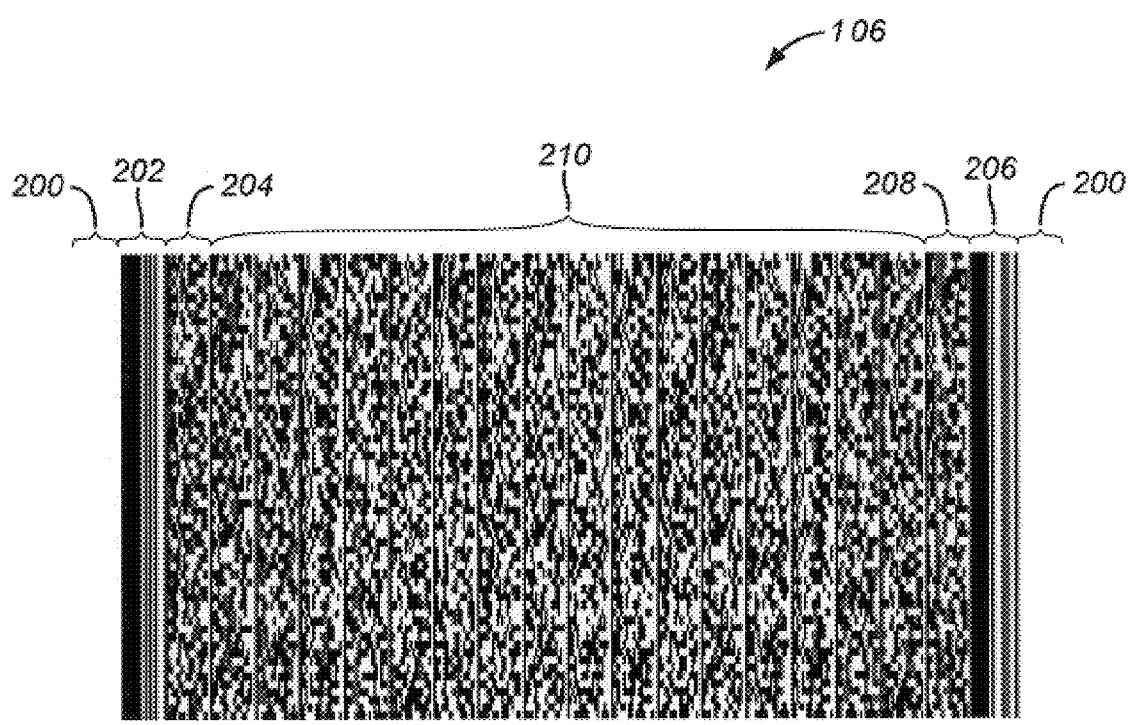
FIG. 2 is an enlarged illustration of an exemplary two-dimensional barcode for use with the present invention.

Referring now to FIG. 2, an exemplary two-dimensional barcode symbol is shown. Although any two-dimensional symbology or matrix may be utilized in conjunction with the present invention, the symbology utilized in the disclosed embodiment is the variable length PDF417 (Portable Data File) symbology, wherein each data character 210 consists of four bars and four spaces in a seventeen module structure, as known to those skilled in the art. Each PDF417 symbol consists of between three and ninety stacked rows surrounded by a quiet zone 200 on all four sides. Each row consists of a leading quiet zone 200, start pattern 202, left row indicator character 204, 1–30 data characters 210, right row indicator character 208, stop pattern 206 and trailing quiet zone 200. The PDF417 standard supports text compaction, numeric compaction and byte compaction that correlate the mapping between code word values and decoded data. PDF417 can accommodate up to 340 characters per square inch with a maximum data capacity of 1850 text characters. The PDF417 symbology has traditionally been read only with expensive two-dimensional scanners.

The quiet zone 200 is a clear space, containing no dark marks, which precedes the start pattern 202 of a barcode symbol and follows a stop pattern 206. These quiet zones 200 are sometimes referred to as the "clear area." The quiet zone 200 allows the scanner to align itself before reading the distance between bars and bar widths themselves. Many codes also have a start and stop pattern 202 and 206 at each end of the code to allow the code to be read from left to right or from right to left. Use of the quiet zones 200 and start/stop patterns 202 and 206 in a decoding process according to the present invention is described more fully below.

PDF417 has a very high data capacity and density. Each signal can code up to 2725 bytes of data at a density of approximately 300–500 bytes per square inch. It is less sensitive to scan orientation than other stacked barcodes vis-à-vis the use of multiple encoding tables that allow partly read rows to be "stitched" back together, in memory, from the partial data of several consecutive scans. PDF417 includes error detection as well as error correction that allows a corrupted symbol to be completely read. PDF417 can be used to encode binary data as well ASCII text and can therefore encode sound and pictures. PDF417 standard allows for nine levels of error correction. At level zero, none of the symbol data is devoted to error correction and no symbol corruption is tolerable. At level eight, approximately 50% of the symbol data is dedicated to error correction check sums and the assemble can be completely decoded with approximately 50% of the symbol being corrupted.

Each row of a PDF417 symbol uses symbol characters from only one of three "clusters" (0, 3 and 6). The first row uses characters from cluster 0; the second row uses characters from cluster 3; the third row uses characters from cluster 6; the fourth row uses characters from cluster 0; the fifth row uses characters from cluster 3; and so forth in a repetitive pattern. The cluster number can be determined from each symbol character. Since any two adjacent rows use different clusters, a software decoder in accordance with the present invention can utilize scans that cross rows while decoding a PDF417 symbol.

The values of the left row indicator characters 204 and right row indicator characters 208 contain the current row number, the total number of rows, the number of columns in the data region, and the error correction level. The symbol character value of the left row indicator 204 is given by the following equations:

$$LRI(I) = 30 \cdot X_i + y, \text{ if } c_i = 0$$

$$30 \cdot X_i + z, \text{ if } c_i = 3$$

$$30 \cdot X_i + v, \text{ if } c_i = 6$$

where: $X_i$=(row number−1) div 3 for i=1 to 90
   y=(number or rows−1) div 3
   z=(error correction level)*3+(number or rows−1)mod 3
   $c_i$=cluster number of the ith row
   div is the integer division operator, rounding down mod is the remainder after division.

Similarly, the symbol character value of the right row indicator 208 is given by the following equations:

$$RRI(I) = 30 \cdot X_i + v, \text{ if } c_i = 0$$

$$30 \cdot X_i + y, \text{ if } c_i = 3$$

$$30 \cdot X_i + z, \text{ if } c_i = 6$$

Figure 3:
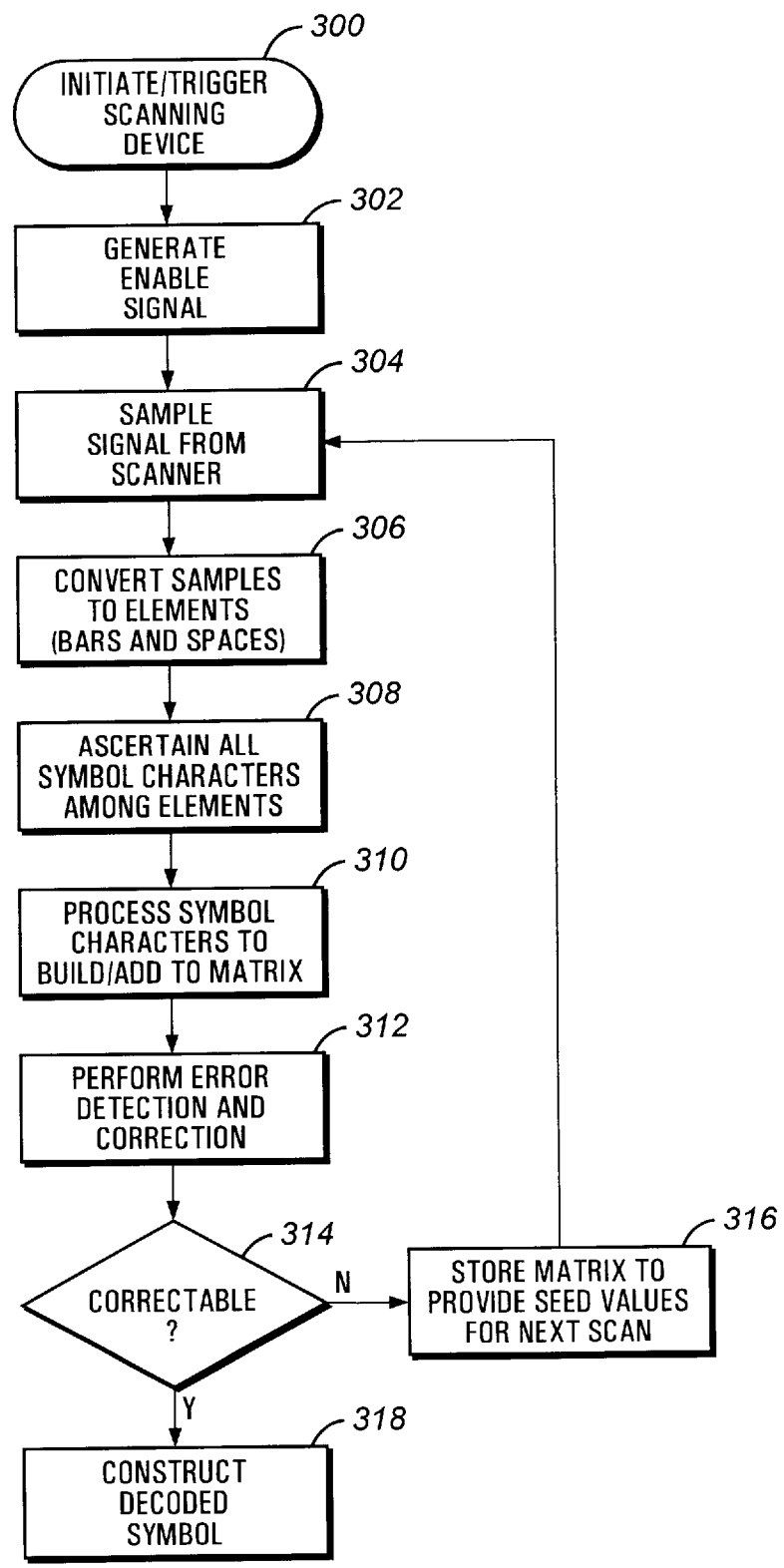
FIG. 3 is a flowchart showing a barcode decoding process according to the present invention.

Referring now to FIG. 3 of flowchart showing a barcode decoding process according to the present invention as shown. The process commences in step 300 following a triggering of the scanning device. As mentioned, triggering may occur in a number of ways, including depression of a button on the barcode scanner 108 and subsequent assertion of the trigger signal TRIGGER to the host computer 102.

Next, in step 302, the host computer 102 communicates an enable signal to the scanner 108. Assertion of the enable signal ENABLE allows the scanner 108 to provide valid data signals to the host computer 102.

In step 304, the data signal DATA from the scanner 108 is sampled by the host computer 102. The decoding process continues in step 306, where the samples generated in step 304 are converted to barcode elements (bars and spaces). Further details of this step are provided in conjunction with FIG. 4.

Following conversion of the data samples, the elements are examined in step 308 to ascertain all symbol characters. Further details of this process are provided in conjunction with FIGS. 5A–5D.

Next, in step 310, symbol characters are processed to build/add to a two-dimensional symbol matrix. Construction of the matrix includes building and populating the rows and columns of the matrix with the information necessary to extract data from the two-dimensional barcode 106. If the two-dimensional barcode 106 incorporates error detection and correction capabilities, these steps are next performed in step 312. Performing error detection and correction functions to provide data for unpopulated rows/columns and to correct incorrect matrix entries. With the PDF417 symbology, the Reed-Solomon Error Control Code algorithm is used for error detection and correction.

Next, in step 314, the results of step 312 are analyzed to determine if information retrieved regarding the two-dimensional barcode 106 is correctable. If not, in step 316 the matrix values established in steps 310 and 312 are stored to provide seed values for the next scan. More specifically, new symbol characters found on subsequent scans may overwrite any existing characters in the matrix or fill in previously empty positions in the matrix. The decoding process next returns to step 304. If the matrix is correctable as determined in step 314, the barcode symbol 106 is constructed and decoded in step 318.

Once decoded, information retrieved from the barcode symbol 106 by the software decoder 100 can be manipulated to allow inclusion of preambles and postambles, remapping of data values (e.g., change "abc" to "ABC"), parsing, sound events, etc. In addition, the information from the decoded barcode symbol 106 may be transmitted in a variety of ways, including: sending the characters as keystrokes to an active application; sending the data to another application via dynamic data exchange (DDE); sending the data to an IP address via TCP/IP; sending the data to a text file for later processing; and sending the data to a communications port. These capabilities are enabled by implementing the decoder as a software decoder 100.

Figure 4:
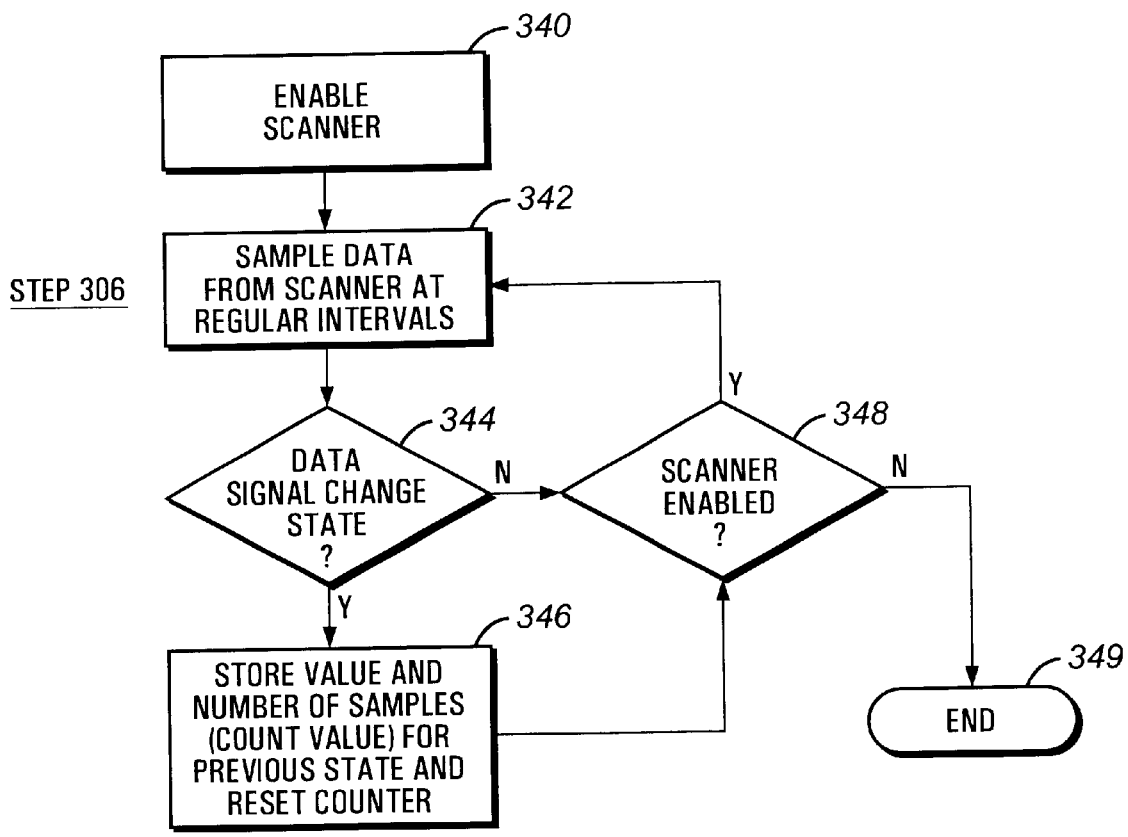
FIG. 4 is a flowchart illustration providing further details of the conversion step of FIG. 3.
Figure 5A:
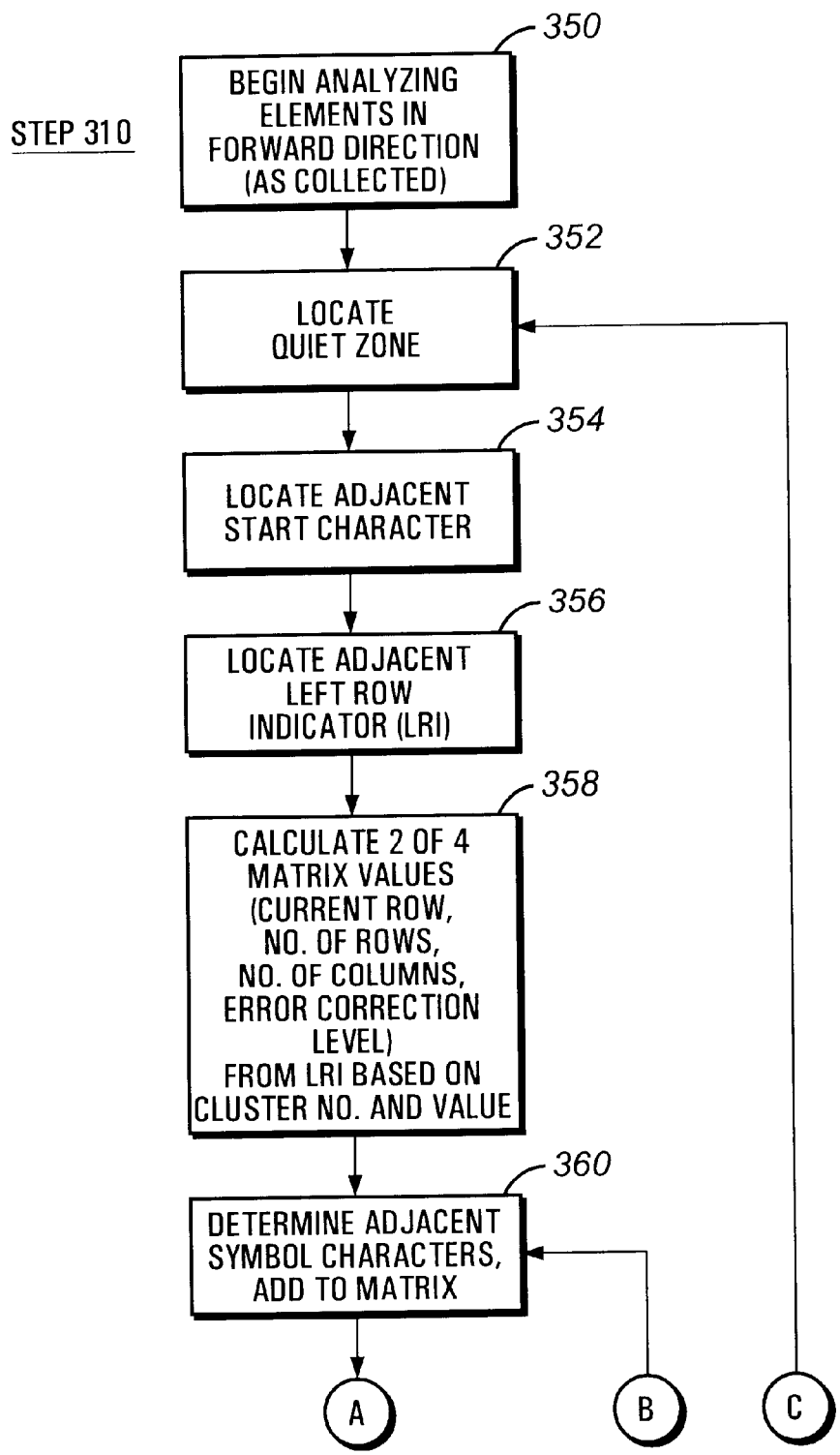
FIGS. 5A—5D is a flowchart illustration of processing of symbol characters in accordance with the present invention.
Figure 5B:
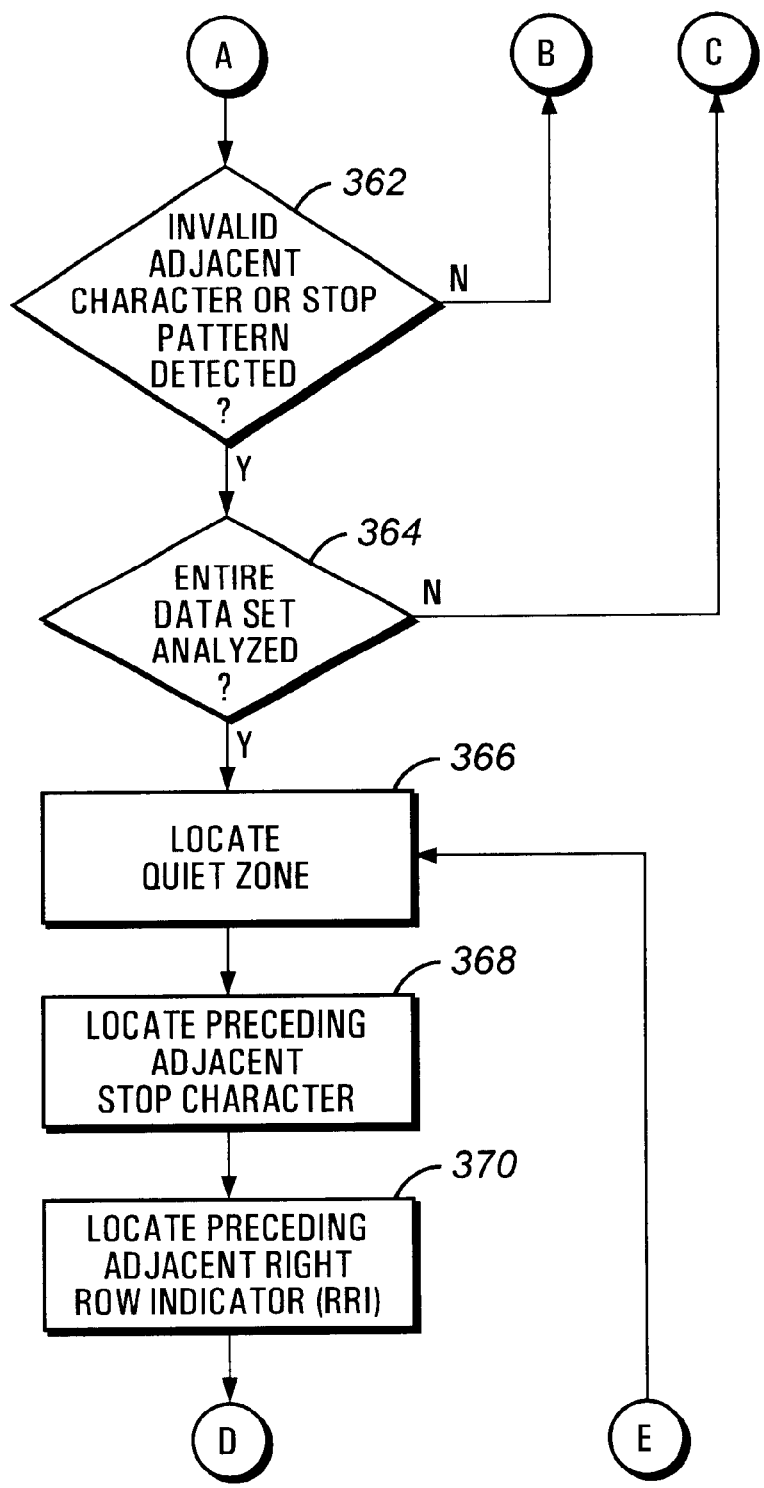
Figure 5C:
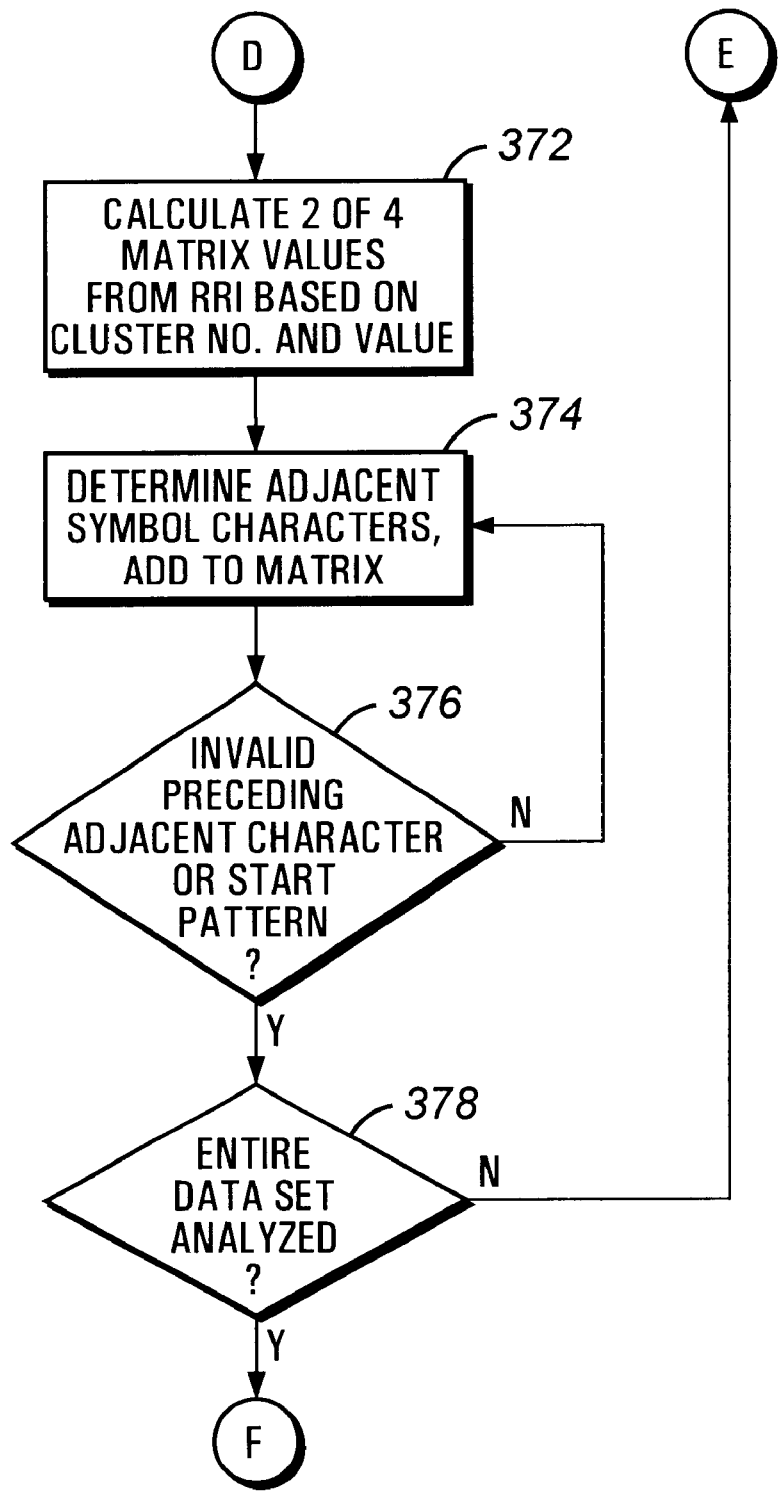
Figure 5D:
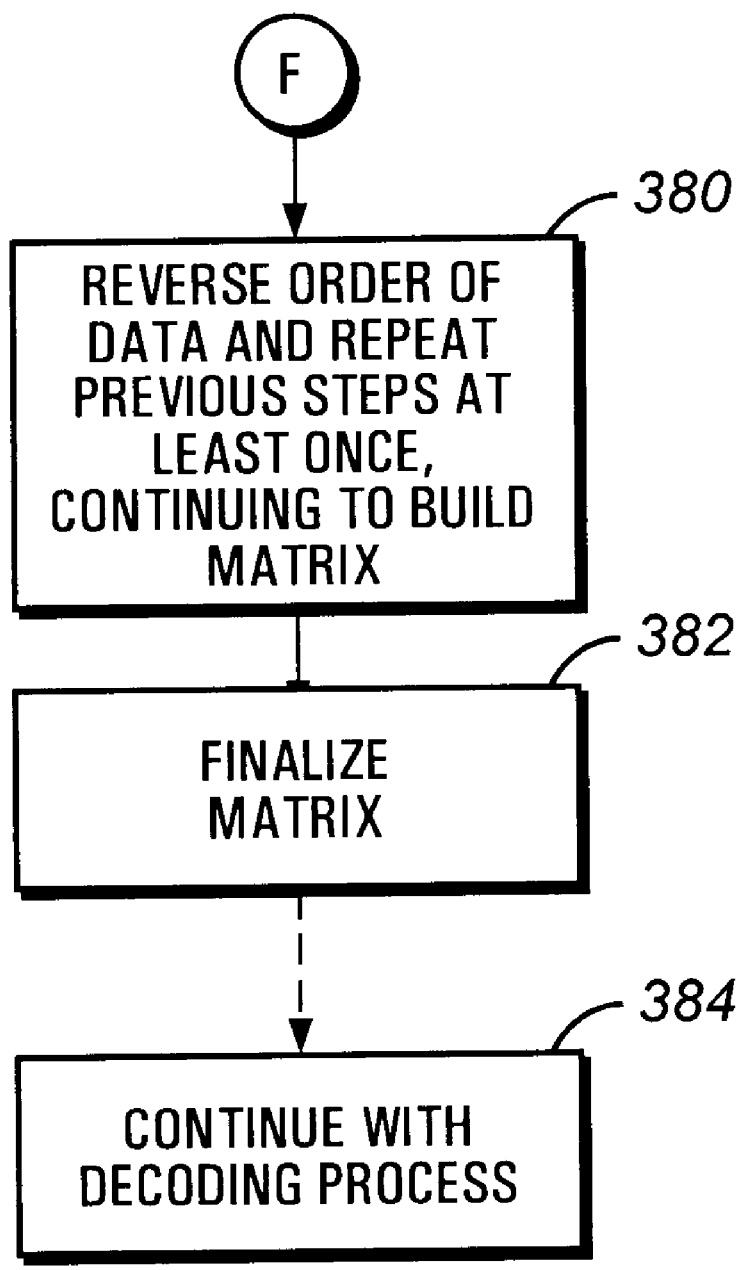

Referring now to FIG. 4, a flowchart is provided detailing the conversion steps 304 and 306 of FIG. 3. An exemplary conversion step commences following enablement of the scanner 108 at step 340. Next, in step 342, the data signal DATA from the scanner 108 is sampled at regular intervals. The conversion process continues in step 344 where it is determined if the data signal DATA has experienced a change in state. A change in state is defined herein as a transition from a one predetermined voltage level or voltage range to another predetermined voltage level or voltage range. For example, a logic level high transition to a logic level low transition may reflect a change in state. If a change in state has occurred, the conversion process continues in step 346 where the "value" and number of samples ("count") for the previous state is stored and the corresponding counter is reset. In the disclosed embodiment of the invention, a count represents the relative width of a bar space, which has been sampled. The value represents whether the element is a bar or a space.

If the data signal has not changed state as determined in step 344, or following step 346, the conversion process proceeds to step 348 to determine if the scanner 108 is still enabled. If so, the conversion process returns to step 342. If not, the conversion process ends in step 349.

Referring now to FIGS. 5A–5D, processing of symbol characters in accordance with the present invention is illustrated. The illustrated steps, which correspond to step 310 of FIG. 3, analyze the data produced by steps 304–306. When a two-dimensional barcode 106 according to the PDF417 standard is scanned, this data generally includes symbol data character(s) 210, left row indicators (LRI) 204, right row indicators (RRI) 208, stop patterns 206, start patterns 202, quiet zone patterns 200, etc. A different process may be performed in steps 310 and 312 for different two-dimensional symbologies.

The processing procedure commences in step 350, where the elements are analyzed in a forward direction (as collected). Next, in step 352, the first quiet zone 200 is located and added to the matrix. As previously mentioned, a quiet zone 200 in accordance with the PDF417 symbology is a white space twice the minimum bar width. After a quiet zone 200 has been located, an adjacent start pattern 202 is located and added to the matrix in step 354. An adjacent left row indicator (LRI) 204 is then located in step 356.

The procedure then continues in step 358 where at least two of four matrix values are calculated. Matrix values include the current row, the number of rows, the number of columns, and the error correction level of the particular barcode symbol 106. These values are determined from the LRI 204 based on the cluster number and value as described in the formulas set forth above, and determine the overall structure of the matrix.

After the preceding values have been calculated and added to the matrix, an adjacent symbol character is determined and added to the matrix in step 360. Next, in step 362 (FIG. 5B), the adjacent symbol character determined in step 360 is analyzed to determine if it is invalid or if a stop pattern 206 is detected. If not, the process returns to step 360 and the next symbol character is located and added to the matrix. If an invalid adjacent data character 210 or stop pattern 206 is detected in step 362, a determination is made in step 364 as to whether the entire undecoded data set has been analyzed. If not, steps 352–362 are repeated until the entire data set has been analyzed. If the entire data set has been analyzed as determined in step 364, the processing of the symbol characters is repeated with an emphasis on right row indicators (RRI) 208. To this end, the first quiet zone 200 of the data set is located in step 366. Next, in step 368, a preceding adjacent stop pattern 206 is located, followed by location of a preceding adjacent RRI 208 in step 370.

The process continues in step 372 (FIG. 5C) where two of the four matrix values (current row, the number of rows, the number of columns, and the error correction level) are calculated from the RRI 208 based on the cluster number and value. Next, in step 374, a preceding adjacent data character 210 is located and then added to the matrix. The adjacent data characters 210 are then analyzed in step 376 to determine if the preceding adjacent data character 210 is invalid or if a start pattern 202 has been detected. If not, control of the process returns to the step 374 for determination of the next preceding adjacent data character 210. If an invalid preceding adjacent data character 210 or start pattern 202 is detected in step 376, a determination is made in step 378 as to whether the entire data set has been analyzed. If not, the process returns to step 366.

If the entire undecoded data set has been analyzed as determined in step 378, the order of the data in the undecoded data set is reversed in step 380 and the previous steps of the process are repeated at least once, continuing to build the matrix. The reversal of the data set is desirable because the barcode scanner 108 may sweep back and forth across the barcode symbol 106. Accordingly, one half of the samples are determined by right to left movement of the barcode scanner 108 with the other half being determined by left to right movement of the barcode scanner 108 across the barcode symbol 106. After the previous steps of the process have been repeated for the reversed data, the matrix is finalized in step 382. In the disclosed embodiment of the invention, the parameters of the barcode symbol 106 are updated with each LRI 204 and RRI 208 that is detected. A voting system may be utilized for each parameter such that the value that is calculated most often is utilized in the finalized matrix generated in step 382. After completion of the matrix, the decoding process continues in step 384 as generally described in FIG. 3.

Thus, a method and apparatus for decoding two-dimensional barcode symbols using a one-dimensional scanner and software decoder has been described. A similar method and apparatus may be utilized for decoding other two-dimensional symbologies or matrices with little or not modification. The decoding process involves coupling the one-dimensional scanner to a serial or other port of a host computer in order to provide a one-dimensional data stream to the software decoder. The software decoder performs a series of iterative steps in which the data stream provided the scanner is sampled and converted to symbol elements. Next, symbol characters are derived from the elements, and a symbol matrix is constructed. Optional error detection and correction procedures may also performed to construct the finalized decoded barcode symbol. The present invention thus obviates the need for expensive scanning and decoding hardware for decoding two-dimensional barcode symbols.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for decoding two-dimensional barcode symbols from a data stream generated by scanning a two-dimensional barcode with a one-dimensional general purpose scanner, the method performed by a host computer system communicatively coupled to the one-dimensional general purpose scanner, the method comprising the steps of:
   sampling an undecoded, unprocessed, one-dimensional data stream until an entire data set is received to generate sampled data;
   converting the sampled data to barcode elements;
   deriving symbol characters from the barcode elements; and
   processing the symbol characters to build a two-dimensional matrix representative of the two-dimensional barcode,
   wherein the relative widths of individual bars and spaces are determined by the number of samples relating to each of said widths of individual bars and spaces.

2. The method of claim 1, further comprising the step of: performing error detection and correction on the two-dimensional matrix.

3. The method of claim 2, further comprising the steps of:
   determining if the two-dimensional matrix is correctable based on the results of the error detection and correction; and, if not
   utilizing the two-dimensional matrix to provide seed values to subsequent scanning decoding operations.

4. The method of claim 1, wherein the step of converting the sampled data to elements comprises the steps of:
   determining if the sampled data has changed state;
   if the sampled data has changed state, storing the state value and number of samples for the previous state; and
   repeating the previous conversion steps for each change of state in the sampled data.

5. The method of claim 4, wherein the barcode elements comprise bars and spaces, a bar being represented by a first state value and a space being represented by a second state value.

6. The method of claim 1, wherein the step of deriving symbol characters from the barcode elements comprises the steps of:
   locating a start character adjacent a quiet zone;
   locating a left row indicator adjacent the start character;
   calculating parameters of the two-dimensional matrix from the left row indicator;
   locating symbol character(s) adjacent the left row indicator; and
   adding the symbol character(s) to the two-dimensional matrix until an invalid character or stop pattern is detected.

7. The method of claim 6, wherein the steps of deriving symbol characters are repeated until the entire undecoded, one-dimensional data stream has been analyzed.

8. The method of claim 6, further comprising the steps of:
   locating a stop character adjacent a quiet zone;
   locating a right row indicator adjacent the stop character;
   calculating parameters of the two-dimensional matrix from the right row indicator;
   locating symbol character(s) preceding the right row indicator; and
   adding the symbol character(s) to the two-dimensional matrix until an invalid character or start pattern is detected.

9. The method of claim 8, wherein the steps of deriving symbol characters are repeated until the entire undecoded, one-dimensional data stream has been analyzed.

10. The method of claim 8, further comprising the steps of:
    reversing the order of the undecoded, one-dimensional data stream; and
    repeating the previous steps of the derivation process on the reversed undecoded, one-dimensional data stream.

11. The method of claim 10, wherein the two-dimensional barcode is essentially compliant with the PDF417 symbology standard.

12. A barcode decoding system for decoding two-dimensional barcode symbols, the system comprising:
    a one-dimensional general purpose barcode scanner for generating an undecoded, unprocessed one-dimensional data stream reflecting a scanning operation on a two-dimensional barcode;
    a host computer system, comprising:
       a communications port, the one-dimensional general purpose barcode scanner being communicatively coupled to the communications port to provide an undecoded, unprocessed one-dimensional data stream to the host computer;

a processor coupled to the communications port;

a processor readable storage medium coupled to the processor, the storage medium containing code directing the host computer system to perform the steps of:

sampling the undecoded, unprocessed one-dimensional data stream until an entire data set is received to generate sampled data;

converting the sampled data to barcode elements;

deriving symbol characters from the barcode elements; and processing the symbol characters to build a two-dimensional matrix representative of the two-dimensional barcode, wherein the step of converting the sampled data to barcode elements comprises the steps of:

determining if the sampled data has changed state;

if the sampled data has changed state, storing the state value and number of samples for the previous state; and repeating the previous conversion steps for each change of state in the sampled data, wherein the barcode elements comprise bars and spaces, a bar being represented by a first state value and a space being represented by a second state value, the relative widths of the individual bars and spaces being determined by the number of samples relating to each of said widths of individual bars and spaces.

13. The barcode decoding system of claim 12, the storage medium containing code further directing the host computer system to perform error detection and correction on the two-dimensional matrix.

14. The barcode decoding system of claim 13, the storage medium containing code further directing the host computer system to perform the steps of:

determining if the two-dimensional matrix is correctable based on the results of the error detection and correction; and, if not utilizing the two-dimensional matrix to provide seed values to subsequent scanning decoding operations.

15. The barcode decoding system of claim 12, wherein the communications port is a serial port.

16. The barcode decoding system of claim 15, wherein the serial port is essentially compliant with the RS232 standard.

17. The barcode decoding system of claim 15, wherein the serial port is essentially compliant with the Universal Serial Bus standard.

* * * * *